United States Patent
Fritzsching et al.

(10) Patent No.: US 6,372,271 B1
(45) Date of Patent: Apr. 16, 2002

(54) SUGAR-FREE DRAGEE CHEWING SWEETS

(75) Inventors: Bodo Fritzsching, Hemsbach (DE); Thomas Keme, Aarau (CH); Anette Radowski, Viernheim; Ingrid Willibald-Ettle, Landau, both of (DE)

(73) Assignee: Sudzucker Aktiengesellschaft Mannheim/Ochsenfurt (DE)

( * ) Notice: Subject to any disclaimer, the term of this patent is extended or adjusted under 35 U.S.C. 154(b) by 0 days.

(21) Appl. No.: 09/355,138

(22) PCT Filed: Jan. 16, 1998

(86) PCT No.: PCT/EP98/00216

§ 371 Date: Aug. 10, 1999

§ 102(e) Date: Aug. 10, 1999

(87) PCT Pub. No.: WO98/32340

PCT Pub. Date: Jul. 30, 1998

(30) Foreign Application Priority Data

Jan. 24, 1997 (DE) .......................................... 197 02 609

(51) Int. Cl.$^7$ ................................................. A23G 3/00
(52) U.S. Cl. .......................... 426/103; 426/89; 426/658; 426/660; 424/440
(58) Field of Search .......................... 426/89, 103, 293, 426/295, 292, 289, 302, 305, 307, 567, 571, 572, 573, 658, 659, 660; 424/440

(56) References Cited

U.S. PATENT DOCUMENTS

| | | | |
|---|---|---|---|
| 4,238,510 A | * 12/1980 | Cherukuri et al. | 426/5 |
| 4,317,838 A | 3/1982 | Cherukuri et al. | 426/5 |
| 4,323,588 A | * 4/1982 | Vink et al. | 426/564 |
| 4,390,523 A | * 6/1983 | Huchette et al. | 424/48 |
| 4,840,797 A | * 6/1989 | Boursier | 424/475 |
| 4,911,937 A | 3/1990 | Corsello et al. | 426/103 |
| 4,961,935 A | 10/1990 | Cherukuri et al. | 426/3 |
| 5,376,389 A | 12/1994 | Reed et al. | 426/5 |
| 5,578,339 A | 11/1996 | Kunz | 426/658 |
| 5,580,601 A | * 12/1996 | Ribadeau-Dumas et al. | 426/660 |
| 5,637,334 A | * 6/1997 | Yatka et al. | 426/3 |
| 5,879,728 A | * 3/1999 | Graff et al. | 426/5 |
| 6,180,143 B1 | * 1/2001 | Rapp et al. | 426/3 |
| 6,248,386 B1 | * 6/2001 | Willibald-Ettle et al. | 426/516 |

FOREIGN PATENT DOCUMENTS

| | | | | |
|---|---|---|---|---|
| DE | 4436362 | | 5/1995 | |
| DE | 19532396 | | 3/1997 | |
| EP | 0625578 | | 11/1994 | |
| EP | 625678 A1 | * | 11/1994 | .......... A01N/25/34 |
| FR | 2467597 | | 4/1981 | |
| WO | 8600226 | | 1/1986 | |
| WO | 8808671 | | 11/1988 | |
| WO | 9730598 A1 | * | 8/1997 | |

* cited by examiner

*Primary Examiner*—Milton I. Cano
*Assistant Examiner*—Robert Madsen
(74) *Attorney, Agent, or Firm*—Ostrolenk, Faber, Gerb & Soffen, LLP

(57) ABSTRACT

The inventions relates to a dragee chewing sweet with a soft caramel core and a dragee coating, whereby the chewing sweet contains a sweetener mixture that is sugar-free.

20 Claims, No Drawings

SUGAR-FREE DRAGEE CHEWING SWEETS

This application has been filed under 35 U.S.C. 371 as a national stage application of PCT/EP98/00216, filed Jan. 16, 1998.

DESCRIPTION

The invention concerns sugar-free, sweet-coated chewing sweets and a process for their production.

Chewing sweets, which are covered by a sugar-coated outer layer, are known. However, these chewing sweets have the disadvantage that they are unsuitable for diabetics because of their sugar-content, have a comparatively high calorific value and encourage dental diseases.

Replacement of the sugar by sugar-substitutes in sugar-coated chewing sweets, however, turns out to be extremely complicated. This is because of, inter alia, the quite complex structure of the sugar-coated chewing sweets and their production process. Thus it is, for example, necessary that the centre of the sugar-coated chewing sweets is dimensionally stable so that it can be stamped and coated with sugar. In addition, the finished sweet-coated chewing sweet must not be too soft so as to prevent it from sticking to the teeth. But also, at the same time, the sugar-coated chewing sweet must not be too hard, otherwise it cannot be chewed. Finally there is also the problem that the sugar-coated outer layer has a slight tendency to splinter off, which considerably reduces the enjoyment value of the chewing sweets. The sugar-coated outer layer of the chewing sweet must in addition be as crunchy as possible from the sensory and organoleptic standpoints, while at the same time it is undesirable for the individual sugar-coated products to stick together. Sweet-coated sugar-free sweets for chewing, which satisfy the afore-mentioned requirements, are not known previously.

The underlying technical problem of this invention is to provide sweet-coated chewing sweets which overcome the above-mentioned disadvantages.

This invention solves this problem by providing chewing sweets containing at least one sweetening agent, which have a soft caramel centre and a sweet-coated outer layer while the sweet-coated chewing sweet is entirely free of sugar. In the context of this invention, a chewing sweet is understood to mean a drug, stimulant or food which is suitable for chewing after ingestion into the oral cavity of man or animal due to its flexible structure and consistency, i.e. it is ductile and does not splinter or break into pieces under relatively large mechanical loading. In particular, it is understood to mean a chewing sweet whose filling has a specific weight of 0.8 to 1.5 g/cm$^3$, preferably 1.0 g/cm$^3$. A filling is taken to mean either the chewing sweet centre or, in case there is additionally a stabilising layer, the chewing sweet centre and the stabilising layer.

The invention therefore provides that both the sweet-coated outer layer and the soft caramel centre contain no sugar. The invention provides for the production of the sweet-coated chewing sweets accordingly not using sugar-containing sweeteners but sugar-free sweeteners.

In an especially preferred way, the invention provides for the use of an equimolar mixture consisting of 6-0-α-D-glucopyranosyl-D-sorbitol (1,6-GPS) and 1-0-α-D-glucopyranosyl-mannitol (1,6-GPM), that is to say Isomalt® or hydrogenated isomaltulose, as sweeteners.

In a further preferred form of implementation, the invention provides for the use of a sweetening agent mixture described in EP 0 625 578 B1, and consisting of 1,6 GPS, 1,1-GPM and 1-0-α-D-glucopyranosyl-D-sorbitol (1,1-GPS), as well as, where appropriate, mannitol, sorbitol, hydrogenated or non-hydrogenated oligosaccharides or, where appropriate, available residual saccharose.

In a particularly advantageous manner according to the invention, a mixture of sweetening agents is used consisting of 10 to 50% by weight 1,6-GPS, 2 to 20% by weight 1,1-GPS and 30 to 70% by weight 1,1-GPM.

However, the invention also provides that a sweetening agent mixture is used consisting of 5 to 10% by weight 1,6-GPS, 30 to 40% by weight 1,1-GPS and 45 to 60% by weight 1,1-GPM (all % by weight data are based on the dry material content). Obviously other sweeteners also can be used according to the invention, providing that these are sugar-free.

The fraction of sweetener in the soft caramel centre is preferably 60 to 90% by weight (based on the dry material). The fraction of the sweetener in the sweet-coated outer layer is preferably 90 to 100% by weight (based on the dry material).

The above-mentioned sweet-coated chewing sweets according to the invention are distinguished by a surprisingly-occurring, chewing gum-like texture. This texture, also described as "longer texture", is possibly based on the sweetener provided according to the invention not crystallising out as quickly as sugar. The longer texture leads to the advantageous effect that the chewing sweets cannot be easily chewed to pieces in the mouth, like conventional sugar-coated chewing sweets, but can persist very much longer in the mouth. This results in an advantageous prolonged release of tastes, which are contained in the sweet-coated chewing sweets, and flavourings or health-giving or health-maintaining constituents, especially medically active constituents. The sugar-fee, sweet-coated chewing sweets according to the invention are in addition distinguished by a pronounced crunchy, non-sticky sweet-coated outer layer as well as dimensional stability.

The invention relates, in a further advantageous form of implementation, to the above-mentioned sweet-coated chewing sweets in which is provided in addition a stabilising layer between the soft caramel centre and the sweet-coated outer layer, the said stabilising layer enveloping the soft caramel centre. The stabilising layer is prepared from a soft caramel mixture, preferably a short-pulled soft caramel mixture. In the context of this invention, a short-pulled soft caramel mixture is understood to mean a soft caramel mixture which was pulled for 0.1 to 10 minutes, preferably 1 minute. Obviously provision can also be made for using a long-pulled or unpulled soft caramel mixture. Also provision obviously can be made for aerating the soft caramel mixture in addition to the pulling process or instead of the pulling process. The soft caramel mixture, which in a preferred form of implementation is applied to the soft caramel centre as a stabilising layer, can be applied by winding or coextrusion, for example, around the soft caramel centre. The stabilising layer holds the soft caramel centre in the desired shape so that during subsequent forming process, for example a stamping or punching process, the preferred designated shape, for example lenticular, of the chewing sweet can be obtained and then coated with sweetener. The invention therefore provides that the sweet-coated chewing sweets are made either without a stabilising layer or with a stabilising layer consisting of soft caramel mixture.

In an advantageous way, the invention further provides that the sweet-coated chewing sweets contain in addition medicinally-active or health-giving or health-maintaining constituents. Medicinally-active or health-giving or health-maintaining constituents can be for example eucalyptus oil menthol benzocaine, cetylpyridinium, dextromethorphan, hexylresorcinol/menthoL dyclonine, phenylpropanolamine, omega-3 fatty acids, vitamins, mineral substances, calcium preparations, magnesium preparations or selenium compounds.

The invention also provides that the sweet-coated chewing sweets contain, apart from the above-mentioned sweetening agents, or one of the above-mentioned sweetening agents, further additional constituents, such as intense sweeteners, aspartame, acesulfame K., maltitol syrup, proteins or hydrolysates, gelatin, oligofiuctosaccharides, inulin, mono- and disaccharide alcohols, fat substitutes, polydextrose, salatrime, vegetable fat, hydrocolloids, gum arabic, colouring ingredients, such as titanium dioxide, emulsifying agents, lecitnin, flavowings, food-compatible acids, such as citric acid, or something similar.

The invention further provides that the weight of the sweet-coated outer layer is 10 to 50% by weight (based on the dry material) of the weight of the sweet-coated chewing sweets.

The invention also concerns a process for producing sugar-free, sweet-coated chewing sweets, which includes production of the soft caramel centre mixture or, where appropriate, the stabilising layer mixture, pulling or aerating the soft caramel centre mixture or additionally the stabilising layer mixture, the necessary combining of the two mixtures if necessary, the forming process, for example punching or stamping, where necessary the surface treatment, for example precoating with gum, the filling thus produced and the subsequent sweet-coating of the where applicable, gum-precoated, intermediate layer.

In a particularly preferred way, provision is made that the soft caramel centre mixture is prepared from hydrogenated isomaltulose, maltitol syrup, water, gelatin, vegetable fat, emulsifying. agents, citric acid and peppermint flavouring or fruit flavourings. In an advantageous way, the invention provides that the hydrogenated isomaltulose and maltitol syrup for preparing the soft caramel centre mixture are heated at normal pressure and/or under a vacuum until a final moisture content of the final product of 3 to 9% and then the additional constituents added in the specified sequence and homogenised. Preferably it is heated to a final moisture content of 6%.

The invention further provides that, subsequent to the homogenisation described above, the soft caramel centre mixture is advantageously cooled to 30 to 50° C., preferably 42 to 48° C.

In a further preferred form of implementation, the invention provides that the pulling time or aeration time of the soft caramel centre mixture is 1 to 15 minutes, preferably 8 minutes. In the preparation of sweet-coated chewing sweets with a stabilising layer, provision is advantageously made for a pulling time or aeration time of the mixture for the stabilising layer of above 0 to 10 minutes, preferably 1 minute.

In an especially preferred way, the invention provides that, when preparing sweet-coated sugar-free chewing sweets without a stabilising layer, the surface temperature of the rope before forming, for example stamping or pressing, must not be above 40° C.

During the preparation of sweet-coated chewing sweets with a stabilising layer, the surface temperature of the rope before forming is 25 to 50° C., preferably 36° C.

In further forms of implementation, the invention provides for the above-mentioned preparation process in which, after forming, the fillings go through a cooling device, for example a cooling tunnel, and in which advantageously the temperature of the filling after passing through the cooling tunnel is 10 to 30° C., preferably 25° C. Subsequent to that, after the advantageously performed surface treatment, for example pregumming, the process according to the invention provides for a sweet coating with a suspension of, for example, hydrogenated isomaltulose, water, gum arabic, colouring and intense sweetener. The sweet-coating process can also be carried out in the form of a soft coating or a hard I soft sweet coating.

Further advantageous forms of the invention emerge from the additional sub-claims.

The invention is explained in more detail below with reference to implementation examples.

EXAMPLE 1

Preparation of a Sugar-free Chewing Sweet With a Stabilising Layer of a Soft Caramel Mixture 1. Preparation of the Soft Caramel Mixture For Centre and Stabilising Layer 1.1 Formulation

|  | % |
|---|---|
| ISOMALT ® (Type M) | 24.20 |
| Maltitol syrup (75% TS) | 51.30 |
| Water | 5.00 |
| Gelatin 120 Bloom (40%) | 3.55 |
| Vegetable fat (34–36° Sp) | 5.80 |
| Emulsifier | 0.75 |
| Citric acid (monohydrate) | 0.70 |
| ISOMALT ® (Type PF) | 8.40 |
| Fruit flavouring | 0.30 |

1.2 Preparation

ISOMALT® (Type Maltitol syrup and water are heated at 125–135° C., preferably 131° C., in a boiler.

Add the gelatine solution.

Add vegetable fat, emulsifier, citric acid, ISOMALT® (Type PF) in the given sequence, while mixing at high speed for 2 to 3 minutes until an homogenous mixture is obtained.

Add fruit flavouring, mix, and empty the boiler.

Homogenise using a suitable homogeniser.

Cool the mixture at 42 to 48° C.

Pulling time of the mixture for the centre: 1 to 15 minutes, preferably 8 minutes. Pulling time for the mixture for the stabilising layer: above 0 to 10 minutes, preferably 1 minute.

The preparation of the soft caramel mixture can be carried out in a batch cooker or continuous cooking equipment.

Pulling of the mixture is carried out with the standard pulling machines or continuous pulling machines or, in the case of aeration, with standard aerators.

Combine the mixtures in the taper roller and form the combined mixtures:

The centre mixture is first put into or continuously fed into the taper roller, so that a cone is formed. The mixture has a temperature of 40 to 50° C., preferably 45° C.

In parallel with that, the stabilising layer is rolled by a vertical taper roller to a 1 to 2 cm carpet and wound around the cone of the centre mixture as an outer layer. The proportion of the stabilising layer to the centre is 1:99%, preferably 55:45% (% based on the total weight of the intermediate layer).

The combined mixtures are then drawn out to a rope, in which the surface temperature of the mixture is approximately 36° C. The rope is formed into preferably lens-shaped fillings using a stamping machine or embossing roller. After leaving the cooling tunnel, the temperature of the fillings is 15 to 30° C., preferably 25° C.

3. Pregumming of the Fillings

Immediately after leaving the cooling tunnel, the fillings are collected in containers and pregummed. For this purpose, a 50% Quick Coat solution (Wolff & Olsen, Hamburg) with 10% titanium dioxide is prepared, which is applied in one amount to the fillings so that the fillings are well-moistened, then the applied solution is sprinkled with Quick Coat powder until the fillings are dry. This process is repeated up to two to three times so that the fillings are stabilised against changes in volume and do not stick together.

4. Sweet Coating
4.1 Formulation

|  | % |
| --- | --- |
| ISOMALT ® (Type M) | 43.65 |
| Water | 29.00 |
| Acesulfame K | 0.05 |
| Aspartame | 0.05 |
| TiO$_2$ | 1.00 |
| Gum arabic (solution 1:1) | 4.10 |
| ISOMALT ® (Type PF) | 22.15 |

1.2 Preparation of the Suspension
1. Preparation of the Solution

ISOMALT® (Type M) is mixed in warm water and heated to 70 to 80° C. until the solution is free of crystals.

2. Preparation of the Suspension the solution prepared as previously described is cooled to 60° C.

aspartame, acesulfame K, gum arabic solution, TiO$_2$ and ISOMALT® (Type PF) are added and stirred until a homogeneous mixture is obtained.

The temperature of the suspension is maintained at 60° C. during the process.

The weight of the sweet-coated outer layer is 10 to 50% of the weight of the finished sweet-coated chewing sweets (based on the dry material).

The sugar-free, sweet-coated chewing sweets prepared in this way, with stabilising layer consisting of a soft caramel mixture, are distinguished particularly by the dimensional stability of its filling. This makes a greater variability in the choice of the filling size possible.

EXAMPLE 2

Preparation of a Sugar-free Chewing Sweet Without a Stabilising Layer

1. Preparation of the Soft Caramel Mixture For the Centre
1.1 Formulation

|  | % |
| --- | --- |
| ISOMALT ® (Type M) | 24.20 |
| Maltitol syrup (75% TS) | 51.30 |
| Water | 5.00 |

-continued

|  | % |
| --- | --- |
| Gelati 120 Bloom (40%) | 3.55 |
| Vegetable fat (34–36° Sp) | 5.80 |
| Emulsier | 0.75 |
| Citric acid (monohydrate) | 0.70 |
| ISOMALT ® (Type PF) | 8.40 |
| Fruit flavouring | 0.30 |

1.2 Preparation

ISOMALT® (Type M), maltitol syrup and water are heated at 125–135° C., preferably 131° C., in a boiler.

Add the gelatine solution.

Add vegetable fat, emulsifier, citric acid, ISOMALT® (Type PF) in the given sequence, while mixing at high speed for 2 to 3 minutes until an homogenous mixture is obtained.

Add fruit flavouring, mix, and empty the boiler.

Homogenise using a suitable homogeniser.

Cool the mixture to 42 to 48° C.

Pulling time for the mixture for the centre: 1 to 15 minutes, preferably 8 minutes.

The preparation of the soft caramel mix can be carried out in a batch cooker or continuous cooking equipment.

Pulling of the mixture is carried out with the standard pulling machines or continuous pulling machines or, in the case of aeration, with standard aerators.

2. Forming of the Mixture

Processing of the mixture is carried out in the normal way, in which the forming of the fillings is performed by an embossing machine. The surface temperature of the rope before the stamping operation is not greater than 35° C. After stamping, the fillings pass through a cooling tunnel. Afterwards, the temperature is 10 to 30° C., preferably 25° C.

3. Pregumming

Immediately after leaving the cooling tunnel, the fillings are collected in containers and pregummed. For this purpose, a 50% Quick Coat solution (gum arabic, Wolff & Olsen, Hamburg) with 10% titanium dioxide is prepared, which is applied in one amount to the fillings so that the filings are well-moistened, then the applied solution is sprinkled with Quick Coat powder until the fillings are dry. This process is repeated up to two to three times so that the f are stabilised against changes in volume and do not stick together.

4. Sweet Coating

Sweet is carried out with an ISOMALT® suspension according to the formulation described in Example 1, Point 4.1.

The sugar-free sweet-coated prepared without a stabilising layer are distinguished by their enhanced chewability.

What is claimed is:

1. A sweet-coated chewing sweet, containing at least one sweetening agent, with a soft caramel centre, a sweet-coated outer layer and a stabilising layer enveloping the soft caramel centre and arranged between the soft caramel centre and the sweet-coated outer layer, wherein the stabilising layer is a soft caramel layer, the sweet-coated chewing sweet is sugar-free and the sweetening agent is hydrogenated isomaltulose or a mixture of 1,1-GPS (1-o-α-D-glucopyranosyl-D-sorbitol), 1,1-GPM (1-o-α-D-glucopyranosyl-mannitol) and 1,6-GPS (6-o-α-D-glucopyranosyl-D-sorbitol) and optionally sorbitol, mannitol, hydrogenated or non-hydrogenated oligosaccharides.

2. A sweet-coated chewing sweet according to claim 1 characterised in that the sweetening agent is hydrogenated isomaltulose.

3. A sweet-coated chewing sweet according to claim 1 characterized in that the sweetening agent is a mixture of 1,1-GPS (1-o-α-D-glucopyranosyl-D-sorbitol), 1,1-GPM (1-o-α-D-glucopyranosyl-mannitol) and 1,6-GPS (6-o-α-D-glucopyranosyl-D-sorbitol) and optionally sorbitol, mannitol, hydrogenated or non-hydrogenated oligosaccharides.

4. A sweet-coated chewing sweet according to claim 1 characterised in that the sweet-coated chewing sweet contains, apart from the sweetening agent, maltitol syrup, protein, hydrolysates, hydrocolloids, fat substitutes, oligofructosaccharides, inulin, polydextrose, salatrime, vegetable fat, gum arabic, acesulfame K, aspartame, colourings, flavourings, aromas, food-compatible acids or emulsifiers or mixtures thereof.

5. A sweet-coated chewing sweet according to claim 1 characterised in that the sweet-coated chewing sweet contains in addition medicinally-active constituents, vitamins or mineral substances.

6. A sweet-coated chewing sweet according to claim 1 characterised in that the weight of the sweet-coated outer layer is 10 to 50% by weight (based on the dry material) of the weight of the sweet-coated chewing sweet.

7. A sweet-coated chewing sweet according to claim 1 characterised in that the specific weight of the soft caramel centre is 0.8 to 1.5 g/cm$^3$.

8. A sweet-coated chewing sweet according to claim 7, characterised in that the specific weight of the soft caramel centre is 1.0 g/cm$^3$.

9. A sweet-coated chewing sweet according to claim 1, characterized in that the stabilizing layer is a short-pulled soft caramel layer.

10. A process for preparing a sugar-free, sweet-coated chewing sweet of claim 1, including the preparation of the soft caramel centre mixture, the pulling or aeration of the soft caramel centre mixture, the forming as well as the subsequent sweet-coating of the soft caramel centre thus prepared.

11. A process according to claim 10, in which the surface temperature of the soft caramel centre mixture before forming is not more than 40° C.

12. A process according to claim 11, in which the surface temperature of the combined soft caramel centre mixture and the stabilising layer mixture before forming is 25 to 50° C.

13. A process according to claim 12, in which the surface temperature of the combined soft caramel centre mixture and stabilizing layer mixture before forming is 36° C., in which the soft caramel centre mixture and the stabilizing layer mixture or both is cooled before the pulling operation to 42–48° C., in which the soft caramel centre is subjected to pregumming after the forming operation and before the sweet-coating operation, in which the pulling or aeration time for the soft caramel centre mixture is eight minutes and which the pulling or aeration time for the stabilizing layer mixture is one minute.

14. A process according to claim 10, in which the soft caramel centre mixture is prepared from hydrogenated isomaltulose, and maltitol syrup.

15. A process according to claim 14, in which the hydrogenated isomaltulose and maltitol syrup are heated at normal pressure or under vacuum to a final moisture content of 3 to 9%, (based on the final product) and then the other constituents are added.

16. A process according to claim 10, in which the soft caramel centre are subjected to a surface treatment after the forming operation and before the sweet-coating operation.

17. A process according to claim 10, in which the pulling time or the aeration time for the soft caramel centre mixture is 1 to 15 minutes.

18. A process for preparing a sugar-free, sweet-coated sweet of claim 1, including preparation of the soft caramel centre mixture and stabilizing layer mixture, the pulling or aeration of the soft caramel centre mixture and the stabilizing layer mixture, the combining of both mixtures, and the forming as well as the subsequent sweet-coating of the soft caramel centre thus prepared.

19. A process according to claim 18, in which the pulling time or the aeration time for the stabilising layer mixture is 0.1 to 10 minutes.

20. A process for preparing a sugar-free, sweet-coated chewing sweet of claim 1, in which the soft caramel centre mixture or the stabilising layer mixture or both is cooled before the pulling operation to 30 to 50° C.

\* \* \* \* \*